United States Patent [19]

Gries et al.

[11] Patent Number: 5,111,121

[45] Date of Patent: May 5, 1992

[54] VOLTAGE BOOSTER FOR CRT ELECTRODE SUPPLY

[75] Inventors: Robert J. Gries, Indianapolis; Marvin N. Norman, Noblesville, both of Ind.

[73] Assignee: Thomson Consumer Electronics, Inc., Indianapolis, Ind.

[21] Appl. No.: 714,393

[22] Filed: Jun. 12, 1991

[51] Int. Cl.$^5$ .............................................. H01J 29/70
[52] U.S. Cl. .................................. 315/411; 315/408; 315/382.1
[58] Field of Search ............ 315/408, 411, 382, 382.1; 358/190

[56] References Cited

U.S. PATENT DOCUMENTS 2,783,413  2/1957  Smith .
3,931,548  1/1976  Barchok .
4,144,480  3/1979  Nagasaki et al. .................... 315/411
4,649,325  3/1987  Guerin et al. .
4,692,669  9/1987  Black et al. .

OTHER PUBLICATIONS

Allowed U.S. patent application Ser. No. 508,438, filed Apr. 13, 1990, in the name of Lendaro, entitled, A Power Supply for an Electrode of a CRT.

Primary Examiner—Theodore M. Blum
Attorney, Agent, or Firm—Joseph S. Tripoli; Joseph J. Laks; Sammy S. Henig

[57] ABSTRACT

A boost capacitor has a first terminal that is coupled to a retrace capacitor of a horizontal deflection circuit. A diode couples a trace voltage in an S-shaping capacitor to the boost capacitor to charge the boost capacitor during trace. A second diode rectifies a voltage that is equal to the sum of the boost capacitor voltage and a retrace voltage developed in the retrace capacitor for generating a screen grid voltage for a cathode ray tube.

13 Claims, 1 Drawing Sheet

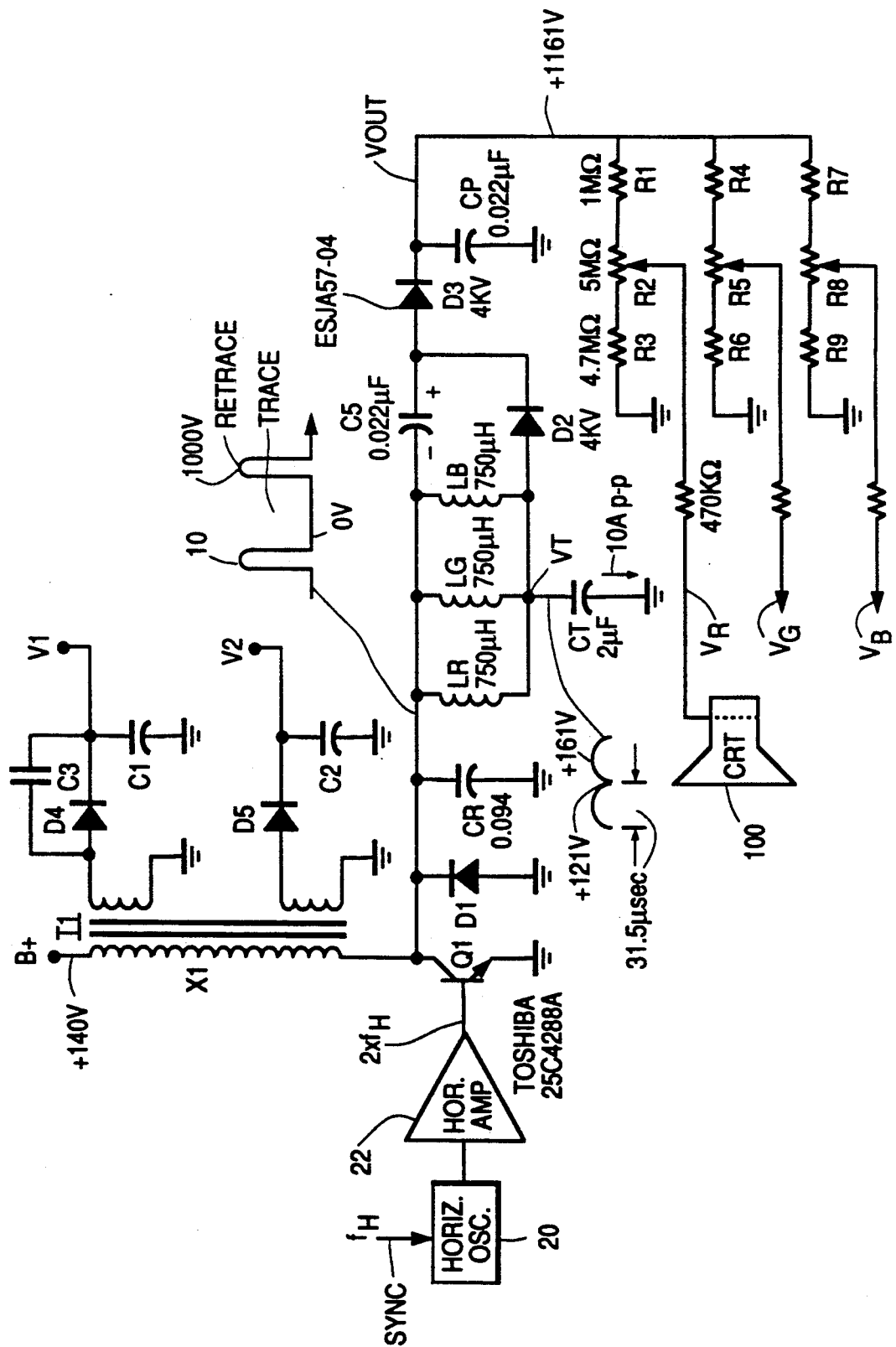

VOLTAGE BOOSTER FOR CRT ELECTRODE SUPPLY

The invention relates to a power supply for a television apparatus. In particular, the invention relates to a high voltage power supply for generating a grid electrode voltage of a cathode ray tube (CRT) such as a screen grid electrode.

In a conventional television receiver, a horizontal flyback transformer is coupled between a collector of a horizontal output transistor and a DC power supply of a B+ supply voltage. The horizontal output transistor is coupled between the flyback transformer and ground, and conducts a current from the B+ power supply to energize the flyback transformer and produce a sawtooth horizontal deflection current in the horizontal deflection winding for repetitive horizontal scanning. The base of the horizontal output transistor is coupled to a horizontal oscillator, which controls a switching operation in the horizontal output transistor. A trace capacitor is coupled between the horizontal deflection winding and ground for developing a DC average trace voltage in the capacitor having a value of, for example, +140 V, that is approximately the B+ supply voltage. A retrace capacitor is coupled between the collector of the horizontal output transistor and ground.

At the collector of the horizontal output transistor and on the retrace capacitor, a high voltage retrace pulse voltage of, for example, 1000 V is developed, during retrace. The flyback transformer is, typically, used for providing high voltage AC input needed for a high voltage DC power supply. By suitable turns ratios between primary and secondary windings of the flyback transformer, a high voltage is generated in the transformer and rectified, during retrace.

It may be desirable to produce a high voltage developed at the screen grid of the CRT without utilizing a secondary winding of the flyback transformer so as to reduce cost.

In accordance with an inventive feature, a boost capacitor charged to a boost voltage is coupled between the collector of the horizontal output transistor and a rectifier. The rectifier produces from a sum of the boost voltage, in the capacitor, and the retrace pulse, at the collector, a DC voltage at the necessary level for the screen grid of the CRT.

A television apparatus power supply, embodying an aspect of the invention, includes a deflection circuit output stage including a deflection winding coupled to a retrace capacitance to form a retrace resonant circuit and a first switch responsive to a signal at a frequency that is related to a deflection frequency and coupled to the retrace resonant circuit. The switch generates a deflection current in the deflection winding and a flyback pulse during a retrace interval of a deflection cycle, such that during a trace interval of the deflection cycle the switch is conductive and conducts the deflection current. A second switch is coupled to a source of a supply voltage and to a series arrangement formed by a capacitor and the first switch for generating a current supplied from the source of the supply voltage that flows in the capacitor and in the first switch to develop a capacitor voltage during the trace interval. The second switch decouples the capacitor from the source of the supply voltage when the flyback pulse is generated to superimpose the capacitor voltage on the flyback pulse. A rectifier is coupled to the capacitor and responsive to the superimposed voltage for generating an output supply voltage at an electrode of a cathode ray tube in accordance with the superimposed voltage.

The sole FIGURE is a schematic diagram illustrating a television power supply according to the invention.

As shown in the FIGURE, a horizontal deflection circuit, for example, of a projection television has three horizontal deflection windings, LR, LG and LB, for the red, green and blue CRTs 100, respectively. However, the invention is also applicable to single yoke television receiver such as direct view color television with one CRT. A winding X1 of a horizontal output transformer T1 (also known as the flyback transformer) is coupled between a terminal where a DC supply voltage B+ is developed and a collector of a horizontal output transistor Q1. A horizontal oscillator 20 is coupled to the base of horizontal output transistor Q1, through a driver stage 22. A retrace capacitor CR is coupled in parallel with horizontal output transistor Q1. A damper diode D1 clamps the voltage at the collector of transistor Q1 positive relative to ground.

Horizontal output transistor Q1 conducts current through winding X1 and through windings LR, LG and LB as the electron beam scans horizontally during the trace interval, and shuts off during retrace, thereby producing flyback or retrace pulses 10 on capacitor CR and on the collector of transistor Q1. Scanning deflection currents shaped as a sawtooth are generated in corresponding parallel coupled deflection windings LR, LG and LB during the trace interval. An S-shaping or trace capacitor CT is coupled between the deflection windings and ground. In addition to the circuit components shown, the deflection circuits normally may include pincushion correction circuits; however these have not been illustrated in order to simplify the drawings.

Various DC supplies are energized from horizontal output transformer T1. These supplies are coupled to secondary windings of horizontal output transformer T1. For example, a diode D4 is coupled to one secondary winding of transformer T1, and charges filter capacitor C1 to provide a DC output voltage V1.

A boost capacitor C5, embodying an inventive feature, is coupled in series with retrace capacitor CR in which retrace pulses 10 are developed. A diode D2 has a cathode coupled to a terminal of boost capacitor C5 that is remote from capacitor CR and an anode that is coupled to a source of a boost voltage VT. The boost voltage source is defined by trace capacitor CT. Capacitor C5 is charged from capacitor CT via diode D2 and transistor Q1 to the level of boost voltage VT in the polarity shown during the trace interval between flyback pulses, i.e., when the voltage on the collector of horizontal output transistor Q1 is close to zero. During flyback time, a boost voltage across the charged boost capacitor C5 is superimposed on the peak level of flyback pulses 10.

A diode D3 has an anode that is coupled between capacitor C5 and diode D2 and a cathode that is coupled to a filter capacitor CP. Diode D3 conducts to charge capacitor CP during the retrace interval, when a given flyback pulse 10 is generated. An output voltage VOUT in capacitor CP is at its peak level during the retrace interval. DC voltage VOUT, is adjustably coupled to the screen grid electrodes via voltage divider including resistors R1, R3, R4, R6, R7, R9 and potentiometers R2, R5 and R8. Voltage VOUT, remains nearly at the peak level due to very slow discharge through resistors R1 through R7 and the screen grid electrodes. The circuit therefore adds to or boosts the voltage level at the collector of transistor Q1 to produce boosted output voltage VOUT at a level that is equal to the sum of the peak voltage at the collector of transistor Q1 and the peak value of voltage VT, developed across boost capacitor C5.

Voltage VT across trace capacitor or S-shaping capacitor CT is parabolic at the horizontal scanning rate. The maximum level occurs at the center of the scan between flyback pulses 10. The peak level of the parabolic voltage occurs during trace and is superimposed on the level of the DC supply voltage B+. Diode D2 will conduct to charge the boost or series capacitor C5 whenever the parabolic voltage across trace capacitor CT exceeds the voltage level on the collector of transistor Q1. During trace, the voltage at the collector of transistor Q1 is nearly zero, which provides a relatively long charging interval for capacitor C5.

What is claimed is:

1. A television apparatus power supply, comprising:
a deflection circuit output stage including a deflection winding coupled to a retrace capacitance to form a retrace resonant circuit and first switching means responsive to a signal at a frequency that is related to a deflection frequency and coupled to said retrace resonant circuit for generating a deflection current in said deflection winding and a flyback pulse during a retrace interval of a deflection cycle, such that during a trace interval of said deflection cycle said switching means is conductive and conducts said deflection current;
a first capacitor;
a source of a supply voltage;
second switching means coupled to said source of said supply voltage and to a series arrangement formed by said capacitor and said first switching means for generating a current supplied from said source of said supply voltage that flows in said capacitor and in said first switching means to develop a capacitor voltage during said trace interval, and for decoupling said capacitor from said source of said supply voltage when said flyback pulse is generated to superimpose said capacitor voltage on said flyback pulse; and
a rectifier coupled to said capacitor and responsive to said superimposed voltage for generating an output supply voltage at an electrode of a cathode ray tube in accordance with said superimposed voltage.

2. A television apparatus power supply according to claim 1, wherein said supply voltage source comprises an S-shaping trace capacitor coupled to said deflection winding.

3. A television apparatus power supply according to claim 2, wherein said S-shaping capacitor is coupled between said deflection winding and a common conductor.

4. A television apparatus power supply according to claim 1, wherein said second switching means comprises a rectifier coupled to said supply voltage source and to a terminal of said capacitor that is remote from said retrace capacitance.

5. A television apparatus power supply according to claim 1, wherein said supply voltage source comprises an S-shaping capacitor coupled to said deflection winding, wherein a first terminal of said first capacitor is coupled between a main current conducting terminal of a switching transistor of said first switching means and between a circuit branch that includes said deflection winding and said S-shaping capacitor and wherein said superimposed voltage is developed at a second terminal of said first capacitor.

6. A television apparatus power supply according to claim 1, wherein said output supply voltage is developed at a screen grid electrode of a cathode ray tube.

7. A television apparatus power supply according to claim 1 wherein said first capacitor is coupled in series with said retrace capacitance.

8. A power supply according to claim 1, wherein an S-shaping capacitor is coupled to said deflection winding and provides said supply voltage that is a parabolic voltage having a peak at a center of a horizontal scan.

9. A television apparatus according to claim 1 wherein said current in said capacitor voltage is at a polarity that causes said superimposed voltage to increase.

10. A television apparatus power supply, comprising:
a deflection circuit output stage including a deflection winding, an S-shaping capacitor coupled to said deflection winding, means for developing a DC voltage in said S-shaping capacitor, a retrace capacitance coupled to said deflection winding to form a retrace resonant circuit and first switching means responsive to a signal at a frequency that is related to a deflection frequency and coupled to said retrace resonant circuit for generating a deflection current in said deflection winding and retrace pulses in said retrace resonant circuit;
a second capacitor;
second switching means coupled to said S-shaping and second capacitors for supplying a current during a trace interval of a deflection cycle from a charge stored in said S-shaping capacitor that develops a DC voltage in said second capacitor; and
means coupled to said second capacitor for generating an output supply voltage in accordance with said second DC voltage.

11. A power supply according to claim 10 wherein said output supply voltage generating means comprises a rectifier coupled to a filter capacitor to form a peak rectifier such that an output voltage level of said output supply voltage approximates a sum of a peak level of said retrace pulses and said capacitor voltage.

12. A power supply according to claim 11, wherein said deflection winding comprises a horizontal deflection winding coupled to a junction between a main current conducting terminal of a horizontal output transistor and a winding of a horizontal flyback transformer.

13. A power supply according to claim 10 wherein said second switching means comprises a rectifier.

* * * * *